United States Patent
Yu et al.

(10) Patent No.: US 7,181,295 B2
(45) Date of Patent: Feb. 20, 2007

(54) METHOD AND APPARATUS FOR PID CONTROLLER WITH ADJUSTABLE DEADTIME COMPENSATION

(75) Inventors: Cheng-Ching Yu, Taipei (TW);
Shih-Bo Hung, Taipei (TW);
Yu-Chang Cheng, Sanchong (TW)

(73) Assignee: National Taiwan University, Taipei (TW)

( * ) Notice: Subject to any disclaimer, the term of this patent is extended or adjusted under 35 U.S.C. 154(b) by 295 days.

(21) Appl. No.: 10/911,338

(22) Filed: Aug. 4, 2004

(65) Prior Publication Data
US 2005/0251272 A1    Nov. 10, 2005

(30) Foreign Application Priority Data
May 19, 2004   (TW) .............................. 93114159 A (51) Int. Cl.
*G05B 13/02* (2006.01)
(52) U.S. Cl. ...................................... 700/42
(58) Field of Classification Search ................. 700/41, 700/42, 43, 44, 45, 54, 71
See application file for complete search history.

(56) References Cited

U.S. PATENT DOCUMENTS 5,568,378 A * 10/1996 Wojsznis ..................... 700/44
6,697,767 B2 * 2/2004 Wang et al. ................. 702/189

2003/0102383 A1 * 6/2003 Nanno et al. ............. 236/78 D

OTHER PUBLICATIONS

Matausek et al. "On the modified Smith Predictor for controlling a process with an integrator and long dead-time" Aug. 1999, IEEE Transactions on Automation Control, vol. 44, pp. 1603-1606.*
Matausek et al. "A Modified Smith Predictor for Controlling a Process with an Integrator and long dead-time" Aug. 1996, IEEE Transactions on Automatic Control, vol. 41, pp. 1199-1203.*
Astrom et al. "A new Smith Preditor for Controlling a process with an integrator and long dead-time", Feb. 1994, IEEE Transactions on Automatic Control, vol. 39, pp. 343-345.*
Ling, Bo "Dynamic Sampling deadtime compensator for distributed field control system", Jun. 2002, Proceedings of the 4th World Congress on Intelligent Control and Automation, pp. 3236-3241.*

* cited by examiner

*Primary Examiner*—Thomas Pham
(74) *Attorney, Agent, or Firm*—Allen, Dyer, Doppelt, Milbrath & Gilchrist, P.A.

(57) ABSTRACT

In the present invention, a Smith predictor enhanced PID controller, SP-PID, is proposed. A tuning parameter $K_{sp}$ is devised and the SP-PID controller would be gradually transformed from a PID controller to a Smith predictor as $K_{sp}$ changes from 0 to 1. Properties of the SP-PID are explored and the design procedure is given to ensure a certain degree of robustness. Simulation results clearly indicate that the SP-PID takes advantage of the SP when small modeling error is encountered and it is gradually detuned to a PID controller, a user-friendly controller, when the model quality degrades. Moreover, the controller and its design procedure can be implemented in current process control computers with virtually no extra hardware cost.

12 Claims, 10 Drawing Sheets

setpoint:

Fig. 6(a)

load:

Fig. 6(b)

setpoint:

Fig. 7(a)

load:

Fig. 7(b)

METHOD AND APPARATUS FOR PID CONTROLLER WITH ADJUSTABLE DEADTIME COMPENSATION

FIELD OF THE INVENTION

The present invention relates to a method and apparatus for PID controller, and more particularly to a method and apparatus with the adjustable deadtime compensation.

BACKGROUND OF THE INVENTION

The Smith predictor (SP) provides a nice controller structure for the deadtime compensation, and it has received considerable attention over past 40 years. Initially, the implementation difficulties encountered in the analog era (60s–80s) had led to little use in process industries. In the following years (80s-), the microprocessor-based implementation makes the SP a new feature in many process control computers as well as single station controllers. However, the modeling requirement, non-trivial tuning, and unfamiliarity prevent wide-spread applications. A typical scenario is that, in order to maintain robust stability, the associated PID (proportion integration differential) controller is detuned to such a degree that the control performance is no better than that of a simple PID controller, and this is especially true for systems with small deadtime to time constant ratio (D/τ). Despite the clear advantage for deadtime dominant processes, the Smith predictor again finds the limited applications throughout process industries. On the other hand, it has been found that the PID controllers remain strong in the digital age.

As mentioned above, the three application difficulties associated with the SP are the modeling, tuning, and familiarity. For the modeling requirement, it can easily be overcome by using relay feedback tests which also becomes a standard feature in many process control computers. Based on the shape information, the model structure as well as model parameters can be identified in a single relay feedback test. The remaining tuning and familiarity problems of the SP are treated simultaneously in the present invention.

Figure 1A:
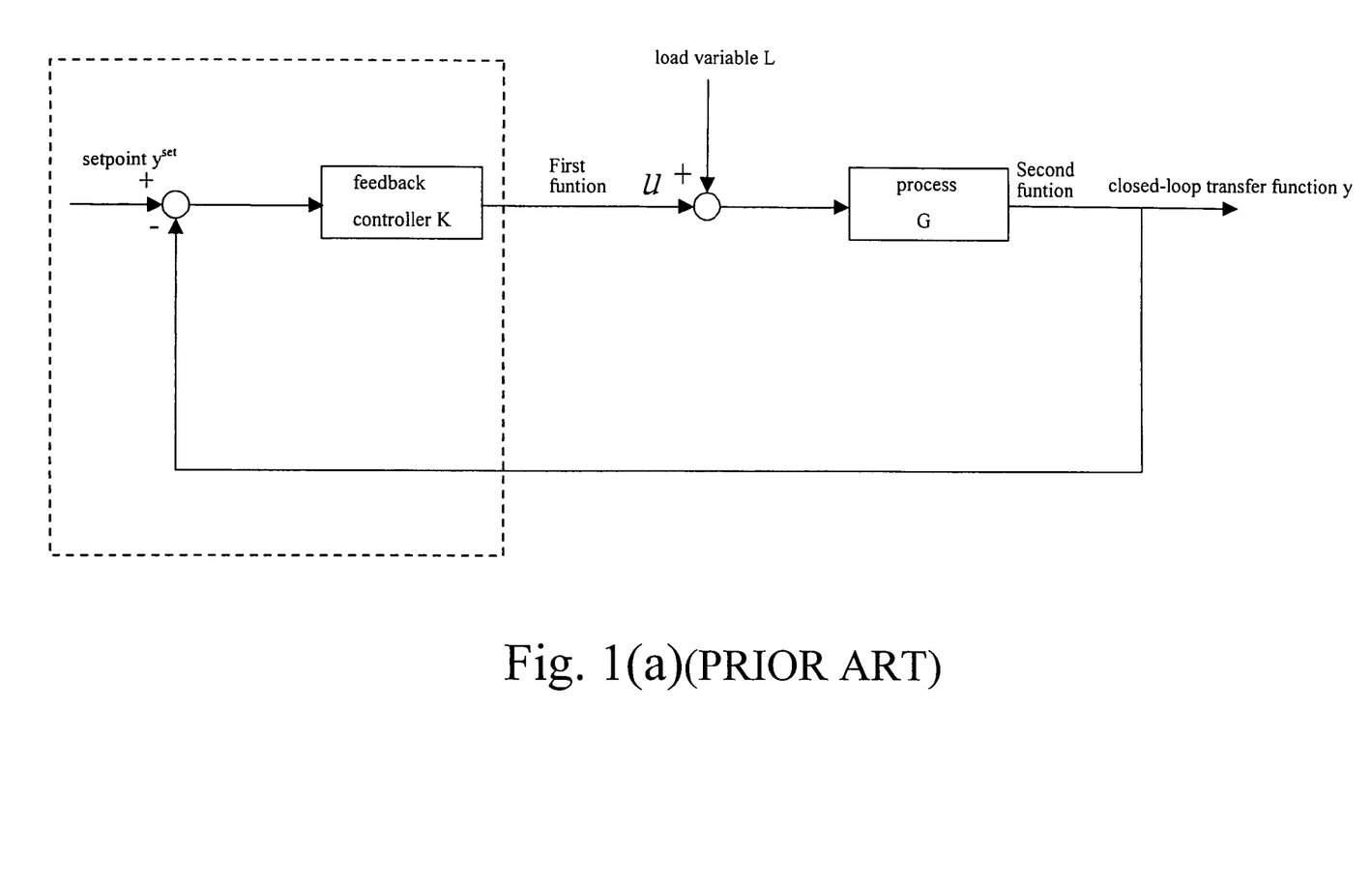
FIG. 1(a) is a structural diagram of a PID controller according to the prior art.
Figure 1B:
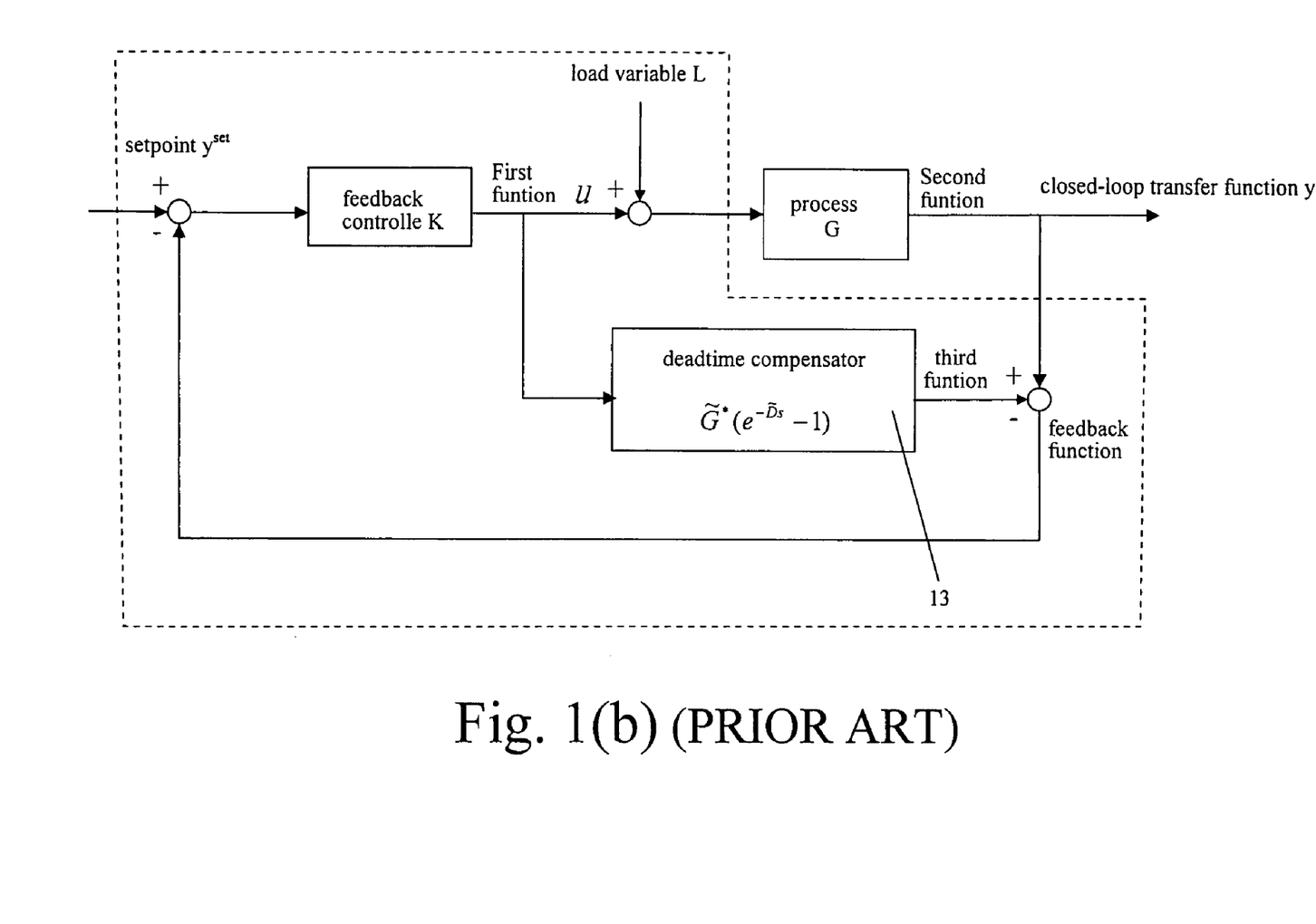
FIG. 1(b) is a structural diagram of a SP controller according to the prior art.

It has been proved that the performance of the SP (as shown in FIG. 1(b)) is inferior to the PID controller (as shown in FIG. 1(a)) for first order plus deadtime systems (FOPDT) with the deadtime to time constant ratio (D/τ) less than 0.2. The PID controller shown in FIG. 1(a) includes a feedback controller K and a process G. In which, the feedback controller K is used for generating a first function u in response to the difference between a set point $y^{set}$ and a closed-loop transfer function y, and the process G is used for generating the closed-loop transfer function y in response to the sum of the first function u and a load variable L of the system. The SP shown in FIG. 1(b) includes the feedback controller K, the process G and a deadtime compensator 13. In which, the feedback controller K is used for generating the first function u in response to the difference between the set point $y^{set}$ and the closed-loop transfer function y, the process G is used for generating the closed-loop transfer function y in response to the sum of the first function u and the load variable L of the system, and the deadtime compensator 13 is coupled to the feedback controller K for generating a third function in response to the first function u, wherein the feedback function is the difference between the second function and the third function. Moreover, for the PID controller, the advantage of the SP can only be seen for FOPDT systems with D/τ greater than 10. It is troublesome because how a model-based approach, with correct controller structure, would fail to achieve improved performance. The reason is obvious that the SP is significantly detuned to achieve a certain degree of robustness (or the PID settings were tightened to obtain better performance). In other words, if a model-based controller is loosely tuned, the performance can not be better than a PID controller. This scenario is often encountered in practice, especially when the users are not familiar with the controller and its tradeoff between the robustness and performance.

From the above descriptions, it is known that how to develop a new method and apparatus for PID controller with the advantage of ensuring a certain degree of robustness has become a major problem waited to be solved. In order to overcome the drawbacks in the prior art, a method and apparatus for PID controller with an adjustable deadtime compensation is provided. The present invention not only solves the problems described above, but also can be implemented in current process control computers with virtually no extra hardware cost. Thus, the invention has the utility for the industry.

SUMMARY OF THE INVENTION

It is an object of the present invention to provide an improved PID controller. It is possible to transform the controller into the traditional PID controller or the SP by utilizing a simple tuning parameter so as to efficiently adjust the control performance and robustness of the system.

It is another object of the present invention to provide an improved controller that is easy to be operated and can be implemented in current process control computer with virtually no extra hardware cost.

In accordance with one aspect of the present invention, a controller with an adjustable deadtime compensation for adjusting a controlling performance and robustness of a system is provided. The controller receives a set point and includes a feedback controller for generating a first function in response to a difference between the set point and a feedback function, a process for generating a second function in response to a sum of the first function and a load variable of said system, and a deadtime compensator coupled to the feedback controller for generating a third function in response to the first function. The feedback function is a difference between the second function and the third function. The deadtime compensator includes a first transfer function having a tuning parameter so that a feedback deadtime constant is adjusted by controlling the tuning parameter of the transfer function, and the control performance and robustness of the system are adjusted accordingly.

Preferably, the process comprises a second transfer function expressed as $\tilde{G}=\tilde{G}^* e^{-\tilde{D}s}$, wherein $\tilde{G}^*$ is a delay free part of process model, $\tilde{D}$ is a deadtime of process model and $\tilde{G}$ is a process model.

Preferably, the first transfer function is expressed as $\tilde{G}^*(e^{-\tilde{D}s}-e^{-(1-K_{SP})\tilde{D}s})$, wherein $\tilde{G}^*$ is the delay free part of process model, $\tilde{D}$ is the deadtime of process model and $K_{SP}$ is the tuning parameter.

Preferably, the feedback deadtime constant of the system is $(1-K_{SP})\tilde{D}$.

Preferably, the controller outputs a closed-loop transfer function expressed as $$y = \frac{KG}{1+K\tilde{G}^*e^{-(1-K_{sp})\tilde{D}s}+KG-K\tilde{G}}y^{set} + \frac{\left(1+K\tilde{G}^*e^{-(1-K_{sp})\tilde{D}s}-K\tilde{G}\right)G}{1+K\tilde{G}^*e^{-(1-K_{sp})\tilde{D}s}+KG-K\tilde{G}}L$$

wherein K is provided by said feedback controller, G is provided by said process, $\tilde{G}^*$ is said delay free part of process model, $\tilde{D}$ is said deadtime of process model, $K_{SP}$ is said tuning parameter, $y^{set}$ is said set point, $\tilde{G}$ is said process model and L is said load variable of said system.

Preferably, when the system is in a specific model, the closed-loop transfer function is simplified as $$y = \frac{KG}{1+KG^*e^{-(1-K_{sp})Ds}}y^{set} + \frac{(1+KG^*e^{-(1-K_{sp})Ds}-KG)G}{1+KG^*e^{-(1-K_{sp})Ds}}L$$

wherein K is provided by said feedback controller, G is provided by said process, G* is said delay free part of process, D is a process deadtime, $K_{SP}$ is said tuning parameter, $y^{set}$ is said set point and L is said load variable of said system.

Preferably, the controller is transferred into a Smith predictor as the tuning parameter is set to 1.

Preferably, the controller is transferred into a PID (proportion-integration-differentiation) controller as the tuning parameter is set to 0.

In accordance with another aspect of the present invention, a method for designing a controller with an adjustable deadtime compensation includes steps of selecting a first tuning factor, determining a minimum deadtime error, obtaining a second tuning factor from a first equation and obtaining a switching point of a tuning parameter from a second equation, and establishing a closed-loop time constant according to the tuning parameter, the first tuning factor, the switching point of the tuning parameter and the second tuning factor.

Preferably, the first tuning factor is for a PID controller.

Preferably, the minimum deadtime error has a typical value of 0.2.

Preferably, the first equation is expressed as $\lambda s+e^{-(1+\delta)\tilde{D}s}-e^{-\tilde{D}s}+1=0$, wherein $\lambda$ is a process closed-loop time constant, $\delta$ is a multiplicative deadtime error and $\tilde{D}$ is a deadtime of process model.

Preferably, the second equation is expressed as $\lambda s+e^{-(1+\delta)\tilde{D}s}=0$, wherein $\lambda$ is said process closed-loop time constant, $\delta$ is said multiplicative deadtime error and $\tilde{D}$ is said deadtime of process model.

Preferably, the second tuning factor is for a Smith predictor.

Preferably, the closed-loop time constant is expressed as $$\frac{\lambda}{D} = \max\left[(1-K_{sp})\delta_{PI}, (1-K_{sp})\delta_{PI}+\left(\frac{K_{sp}-K_{sw}}{1-K_{sw}}\right)\delta_{SP}\right]$$

wherein $K_{SP}$ is said tuning parameter, $\delta_{P1}$ is said first tuning factor, $K_{SW}$ is said switching point of said tuning parameter, $\delta_{SP}$ is said second tuning factor, $\lambda$ is said closed-loop time constant and D is a process deadtime.

In accordance with further aspect of the present invention, a controller for adjusting a feedback deadtime constant of a system includes a deadtime compensator having a transfer function with a tuning parameter, wherein the tuning parameter is controlled to adjust the feedback deadtime constant of the system.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Firstly, a new controller is proposed which includes the Smith predictor as an enhanced feature of a standard PID controller. Next, a new tuning parameter, $K_{sp}$, is devised which provides a gradual transition between the SP ($K_{sp}=1$) and PID ($K_{sp}=0$) controller. That is to say, the Smith predictor functions at its full capacity when the model quality is good and the deadtime compensation feature is gradually turned off as the plant-model mismatch develops, and, ultimately, the controller reduces to the familiar PID controller.

Figure 1C:
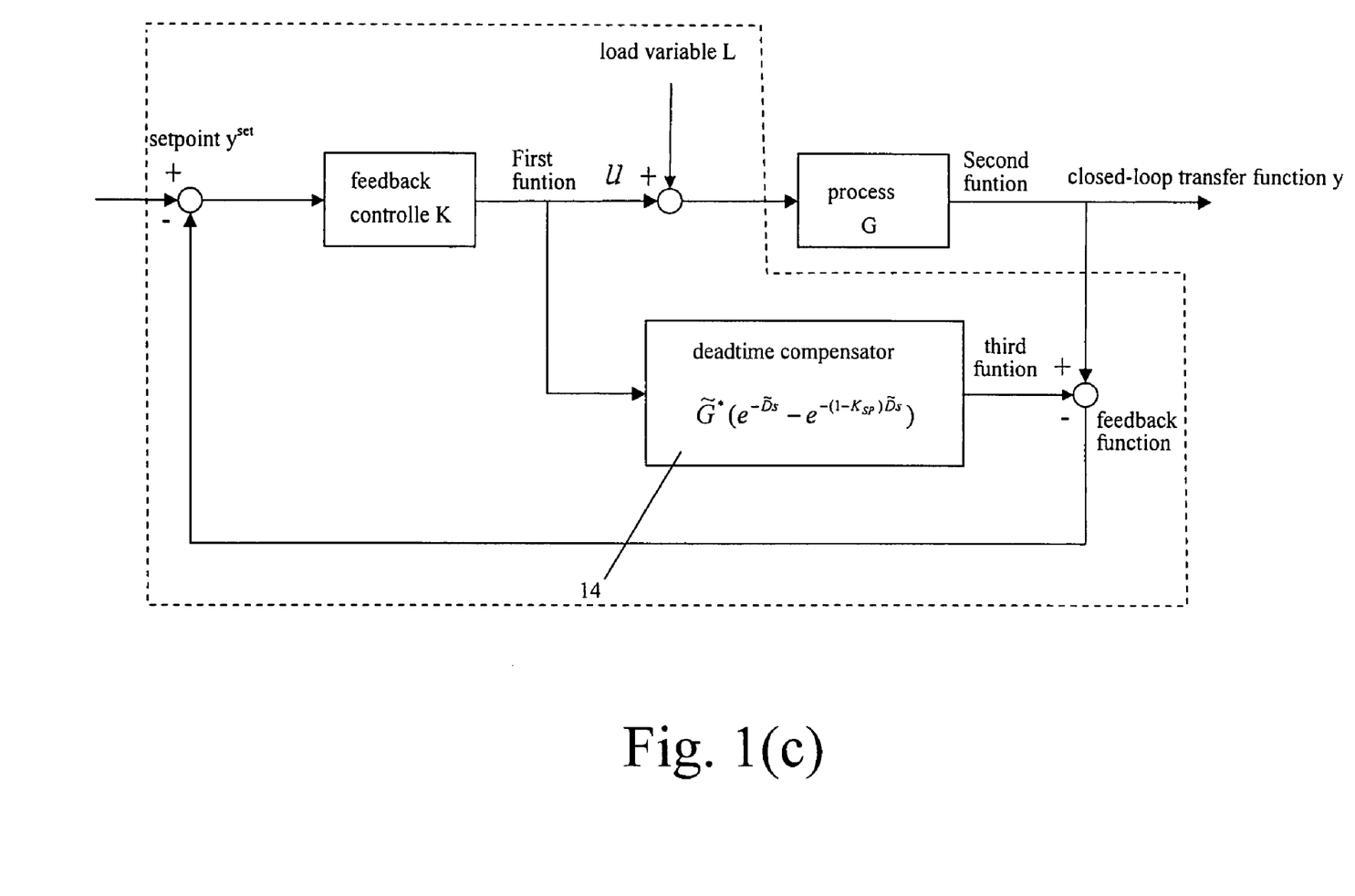
FIG. 1(c) is a structural diagram of a controller with adjustable deadtime compensation according to a preferred embodiment of the present invention.

Please refer to FIG. 1(c), which shows a structural diagram of a controller with adjustable deadtime compensation according to a preferred embodiment of the present invention. The controller receives a setpoint $y^{set}$ and outputs a closed-loop transfer function y, which includes a feedback controller K, a process G and a deadtime compensator 14. In which, the feedback controller K is used for generating the first function u in response to the difference between the set point $y^{set}$ and the closed-loop transfer function y, the process G is used for generating the closed-loop transfer function y in response to the sum of the first function u and the load variable L of the system, and the deadtime compensator 14 is coupled to the feedback controller K for generating a third function in response to the first function u, wherein the feedback function is the difference between the second function and the third function.

The deadtime compensator 14 includes a first transfer function $\tilde{G}^*(e^{-\tilde{D}s}-e^{-(1-K_{sp})\tilde{D}s})$ having a tuning parameter $K_{sp}$ so that a feedback deadtime constant is adjusted by controlling the tuning parameter $K_{sp}$ of the first transfer function $\tilde{G}^*(e^{-\tilde{D}s}-e^{-(1-K_{sp})\tilde{D}s})$, and the control performance and robustness of the system are adjusted accordingly. FIG. 1(c) shows the Smith predictor enhanced PID controller (SP-PID) according to the present invention by using a new tuning parameter $K_{sp}$. FIG. 1(c) indicates that when $K_{sp}$ is set to 1, it becomes the SP, as shown in FIG. 1(b). Whereas when $K_{sp}$ is turned to 0, the controller will be transformed into a traditional PID controller by the feedback signal, as shown in FIG. 1(a). That is, the amount of deadtime in the feedback (DR, remaining deadtime) can be adjusted via $K_{sp}$ from high performance/less robust/less familiarity ($K_{sp}=1$) to nominal performance/increased robustness/high familiarity ($K_{sp}=0$). Certainly, this provides a gradual transition from a SP to a PID controller.

Please refer to the structural diagram in FIG. 1(c), where the process G is expressed in terms of the delay-free part G* and the deadtime portion $e^{-Ds}$.

$$G = G^* e^{-Ds} \quad (1)$$

The model also has a similar structure.

$$\tilde{G} = \tilde{G}^* e^{-\tilde{D}s} \quad (2)$$

When $\tilde{G}^*$ is the delay free part of the model and $\tilde{D}$ is the deadtime in the model, the closed-loop relationship y of the SP can be expressed as $$y = \frac{KG}{1+K\tilde{G}^*+KG-K\tilde{G}} y^{set} + \frac{(1+K\tilde{G}^*-K\tilde{G})G}{1+K\tilde{G}^*+KG-K\tilde{G}} L \quad (3)$$

where $y^{set}$ is the setpoint, K is the feedback controller and L is the load variable. With the perfect model assumption (i.e. $G=\tilde{G}$), we have $$y = \frac{KG}{1+KG^*} y^{set} + \frac{(1+KG^*-KG)G}{1+KG^*} L \quad (4)$$

The advantage of the SP can clearly be seen from the characteristic equation (denominator of Eq. (4)) that the controller K can be designed aggressively to achieve a large bandwidth. For the proposed SP-PID controller in FIG. 1(c), the closed-loop relationship becomes:

$$y = \frac{KG}{1+K\tilde{G}^* e^{-(1-K_{sp})\tilde{D}s}+KG-K\tilde{G}} y^{set} + \quad (5)$$
$$\frac{(1+K\tilde{G}^* e^{-(1-K_{sp})\tilde{D}s}-K\tilde{G})G}{1+K\tilde{G}^* e^{-(1-K_{sp})\tilde{D}s}+KG-K\tilde{G}} L$$

Similarly, when $G=\tilde{G}$, one obtains:

$$y = \frac{KG}{1+KG^* e^{-(1-K_{sp})Ds}} y^{set} + \frac{(1+KG^* e^{-(1-K_{sp})Ds}-KG)G}{1+KG^* e^{-(1-K_{sp})Ds}} L \quad (6)$$

Eq. (6) clearly contrasts the difference between the SP and the SP-PID, where, for the later, the remaining deadtime ($D_R=(1-K_{sp})D$) in the feedback loop is adjustable via $K_{sp}$. It becomes a SP on one end ($K_{sp}=1$) and resumes the role of a PID controller on the other end ($K_{sp}=0$).

Let us use the first order plus deadtime (FOPDT) process to illustrate the performance and robustness characteristics of SP-PID control. Consider:

$$K_c = \frac{\tau_1}{K_p \lambda} \quad (7)$$

Here, $K_p$ is the steady-state gain, τ is the time constant, and D is the deadtime. Without loss of generality, we use IMC type of tuning rule for a PI controller. Firstly, a closed-loop time constant λ is selected and the controller gain becomes:

$$K_c = \frac{\tau_1}{K_p \lambda} \quad (8)$$

and the rest time $\tau_1$ is simply set to:

$$\tau_1 = \tau \quad (9)$$

Note that this assumption will be relaxed later. In doing this, the closed-loop relationship for the SP-PID becomes:

$$y = \frac{e^{-Ds}}{\lambda s + e^{-(1-K_{sp})Ds}} y^{set} + \frac{\lambda s + e^{-Ds}(e^{K_{sp}Ds}-1)}{\lambda s + e^{-(1-K_{sp})Ds}} \frac{K_p e^{-Ds}}{\tau s + 1} L \quad (10)$$

where λ is the closed-loop time constant. The integrated error (IE) for a unit step setpoint change can be derived analytically by using the final-value theorem.

$$(IE)_{setpoint} = \lim_{s \to 0} s \frac{\lambda s - (e^{-K_{sp}Ds}-1)}{(\lambda s + e^{-(1-K_{sp})Ds})(\tau s + 1)} \frac{1}{s} \cdot \frac{1}{s} = \lambda + K_{sp}D \quad (11)$$

Eq. (11) shows that the IE is a function of the closed-loop time constant (λ) as well as $K_{sp}$. If λ is a function of the remaining deadtime ($D_R$) in the feedback loop and follows the IMC-PI tuning rule, we have:

$$\lambda = 1.7 D_R = 1.7(1-K_{sp})D \quad (12)$$

and IE thus becomes:

$$(IE)_{setpoint} = (1.7 - 0.7 K_{sp})D \quad (12\text{-}1)$$

Figure 2A:
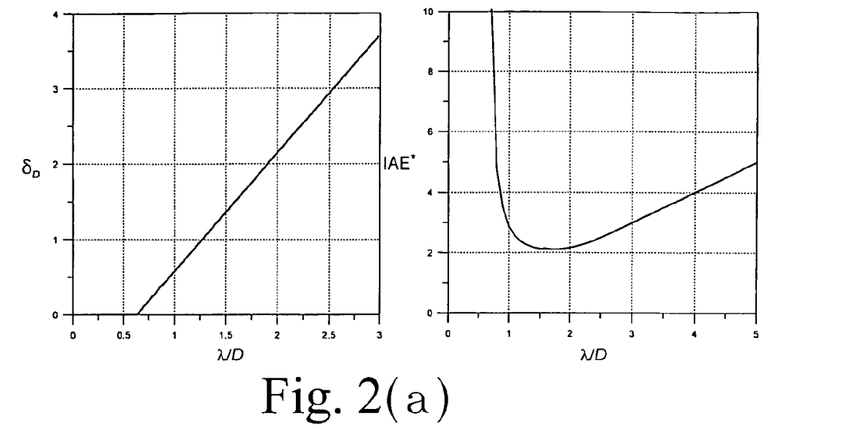
FIG. 2(a) shows a simulation result of the tolerable deadtime error and integrated absolute error for the PID controller.
Figure 2B:
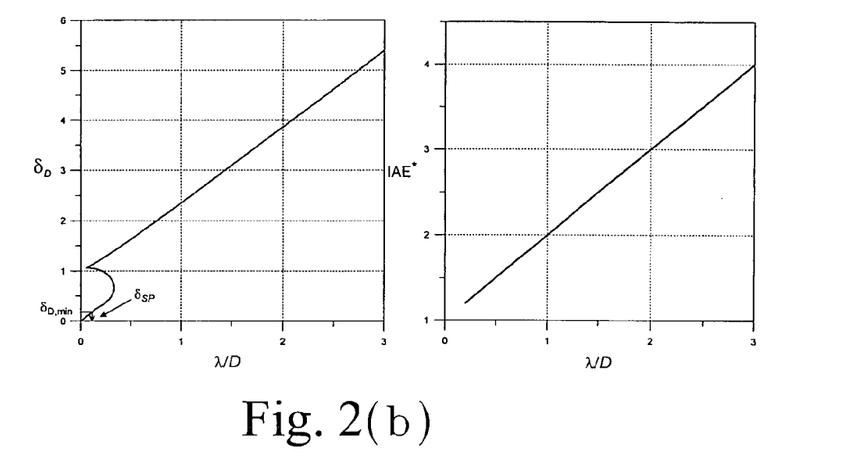
FIG. 2(b) shows a simulation result of the tolerable deadtime error and integrated absolute error for the Smith predictor.
Figure 2C:
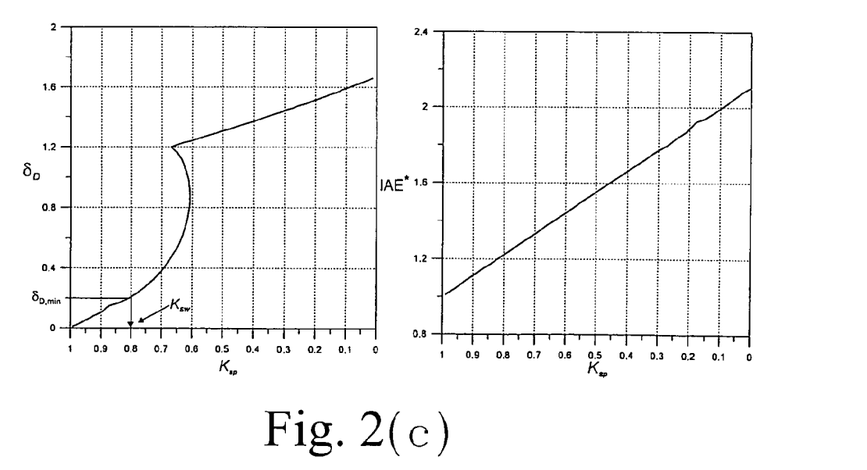
FIG. 2(c) shows a simulation result of the tolerable deadtime error and integrated absolute error for the controller with adjustable deadtime compensation according to a preferred embodiment of the present invention.

Despite the fact that the IE is a good performance measure only for the monotonic step response, it provides a qualitative indication of the closed-loop performance for the SP-PID. FIGS. 2(a), 2(b), and 2(c) show more realistic performance measures and the normalized integrated absolute error (IAE*) for the proposed controller. For a FOPDT system, the normalized IAE is defined as:

$$IAE^* = \frac{IAE}{IAE_{min}} \quad (13)$$

where $IAE_{min}$ is the minimum IIE and is simplified as $IAE_{min} = D$ for a unit step change for a FOPDT system. FIG. 2(c) shows that the performance is improved as we turn on the deadtime compensation of the controller via an increased $K_{sp}$. Qualitative correct trend is also seen as compared to the simple performance measure in Eq. (12). Similarly, the performance of the SP can be conjectured from Eq. (10) by setting $K_{sp}=1$, and the normalized IAE (IAE*) is also shown in FIG. 2(b). However, the performance degrades significantly for a PI controller at the region of small λ (as shown in FIG. 2(a)) due that the stability constraint is almost violated and the oscillatory responses would be resulted at the region of small λ. The performance parts (IAE*) of FIGS. 2(a)~2(c) indicate that the SP-PID takes the advantage of the Smith predictor at the high performance region, and it is reduced to a PID controller when the performance requirement is low.

The characteristic equation in Eq. (5) can be applied to evaluate the robust stability with respect to the deadtime error. Assume that the uncertainty occurs in the deadtime part (i.e. D≠D̃), the closed-loop characteristic equation (CLCE) becomes:

$$\lambda s + e^{-(1-K_{sp})\tilde{D}s}(e^{-(K_{sp}+\delta D)\tilde{D}s} - e^{-K_{sp}\tilde{D}s} + 1) = 0 \quad (14)$$

where δ is the multiplicative deadtime error, i.e.

$$\delta = \frac{D - \tilde{D}}{\tilde{D}}.$$

Taking the extremes ($K_{sp}=0$ and $K_{sp}=1$), the CLCE's for the PI and SP are:

$$\lambda s + e^{-(1+\delta)\tilde{D}s} = 0 \quad (15)$$

$$\lambda s + e^{-(1+\delta)\tilde{D}s} - e^{-\tilde{D}s} + 1 = 0 \quad (16)$$

Eqs. (14)~(16) can be applied to compute tolerable deadtime errors ($\delta_D$) for different closed-loop time constants. The tolerable deadtime error means the amount of deadtime error leading to the limit of stability. Interesting enough, conditional stability for the SP is observed as well as SP-PID exceeds certain ranges of controller settings not observed for the PID controller. FIG. 2 also reveals the extreme sensitivity for deadtime error when λ approaches zero or $K_{sp}$ approaches one. Certainly, such settings are not acceptable in practice, despite the nearly perfect performance.

Design

The principle is to turn the SP gradually toward the PID controller when the model quality degrades for maintaining a certain degree of robustness at the SP end with respect to deadtime error. Let us consider controller tunings at two extremes, $K_{sp}=0$ and $K_{sp}=1$. At the PI control end ($K_{sp}=0$), the closed-loop time constant λ is set proportional to the deadtime. That is:

$$\lambda = \delta_{P1} \cdot D \quad (17)$$

A typical value of $\delta_{P1}=1.7$ is often employed according to the IMC-PI rule. At the SP side, λ is often selected to handle a pre-determined degree of deadtime error. It is to be noted that the setting does not have to be conservative because the tradeoff between the robustness and performance is handled by the controller via changing $K_{sp}$. A typical value of 20% tolerable deadtime error ($\delta_{D,min}=0.2$) is recommended at the performance end. Therefore, we can obtain $\delta_{D,min}$ directly from FIG. 2(b) or compute $\delta_{SP}$ from Eq. (16). Thus, we have:

$$\lambda = \delta_{SP} \cdot D \quad (18)$$

Figure 3A:
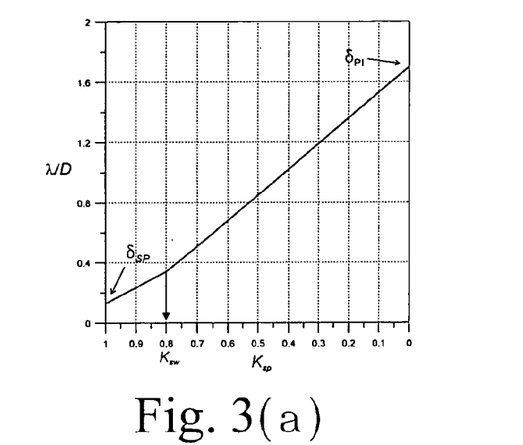
FIG. 3(a) shows a simulation result of the closed-loop time constant for the controller with adjustable deadtime compensation according to a preferred embodiment of the present invention.
Figure 3B:
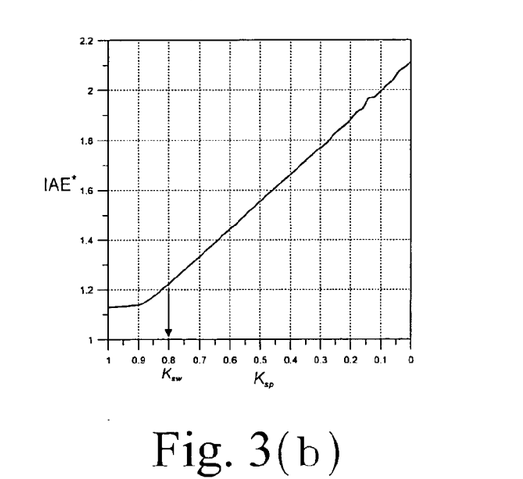
FIG. 3(b) shows a simulation result of the integrated absolute error for the controller with adjustable deadtime compensation according to a preferred embodiment of the present invention.
Figure 3C:
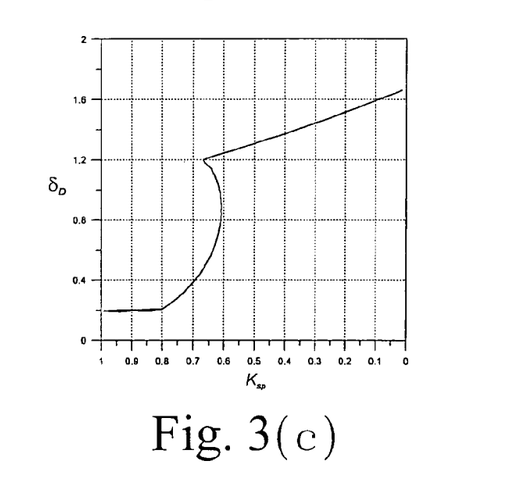
FIG. 3(c) shows a simulation result of the tolerable deadtime error for the controller with adjustable deadtime compensation according to a preferred embodiment of the present invention.

In theory, Eqs (17) and (18) will be sufficient to formulate the tuning constant for the SP-PID. However, in order to ensure that the tolerable deadtime error is larger than $\delta_{D,min}$ over the entire $K_{sp}$ range (0~1), a switching point of $K_{sp}$ has to be located for making the tolerable deadtime error as $\delta_{D,min}$. Then, a linear interpolation is employed to set the closed-loop time constant for $K_{sp}$ greater than $K_{sw}$, as shown in FIGS. 3(a), 3(b) and 3(c). In other words, we have:

$$\begin{cases} \dfrac{\lambda}{D} = (1 - K_{sp})\delta_{PI}, \ K_{sp} \leq K_{sw} \\ \dfrac{\lambda}{D} = (1 - K_{sp})\delta_{PI} + \left(\dfrac{K_{sp} - K_{sw}}{1 - K_{sw}}\right)\delta_{SP}, \ K_{sp} > K_{sw} \end{cases} \quad (19)$$

Therefore, the controller design procedure becomes:
S1. Select $\delta_{P1}$ (e.g., from IMC-PI tuning rule).
S2. Determine $\delta_{D,min}$ (a typical value is $\delta_{D,min}$=0.2, 20% deadtime error).
S3. Find $\delta_{SP}$ from Eq.16 (or FIG. 2(b)) and $K_{sw}$ from Eq. 15 (or FIG. 2(c)).
S4. Set the closed-loop time constant to $$\dfrac{\lambda}{D} = \max\left[(1 - K_{sp})\delta_{PI}, (1 - K_{sp})\delta_{PI} + \left(\dfrac{K_{sp} - K_{sw}}{1 - K_{sw}}\right)\delta_{SP}\right]$$

If IMC-PI tuning rule is employed (i.e. $\tau_1=\tau$ and $\delta_{P1}/=1.7$), for $\delta_{D,min}=0.2$, we have: $K_{sw}=0.8$ and $\delta_{SP}=\lambda/D=0.129$. FIGS. 3(a), 3(b) and 3(c) show the relationships among the closed-loop time constant $\lambda/D$, the performance (IAE*), and the tolerable deadtime error ($\delta_D$) robustness. It is to be noted that FIGS. 3(a), 3(b) and 3(c) remain the same for FOPDT systems with all possible D/τ ratios provided with the plain IMC-PI tuning, i.e. $\tau_1=\tau$ and $K_c K_p=\tau_1/\lambda$. FIG. 3(b) also shows that the IAE at the PID contrller ($K_{sp}=0$) is at 210% of the minimum value as opposed to 170% predicted by Eq. (9) using the integrated error (IE). The reason is obvious that the areas above and below the set point are ignored during a non-monotonic setpoint response. The control performance can be improved by using improved IMC-PI tuning rules.

Performance Improved PID Tuning

The improved IMC-PI tuning rule takes the effect of deadtime into consideration, and thus the reset time is adjusted according to $\tau_1=\tau+D/2$. Following the same line, the controller gain becomes: $K_c K_p = \tau_1/(\delta_{P1} \cdot D) = \tau_1/(1.7 \cdot D)$. Using this setting, the closed-loop characteristic equation for the SP-PID can be expressed as (cf. Eq. (14)):

$$\lambda s + \dfrac{\{1 + [\tau + (1 - K_{sp})\tilde{D}/2]s\}}{\tau S + 1} \quad (20)$$
$$e^{-(1-K_{sp})\tilde{D}s}\left[e^{-(K_{sp}+\delta)\tilde{D}s} - e^{-K_{sp}\tilde{D}s} + 1\right] = 0.$$

Figure 4A:
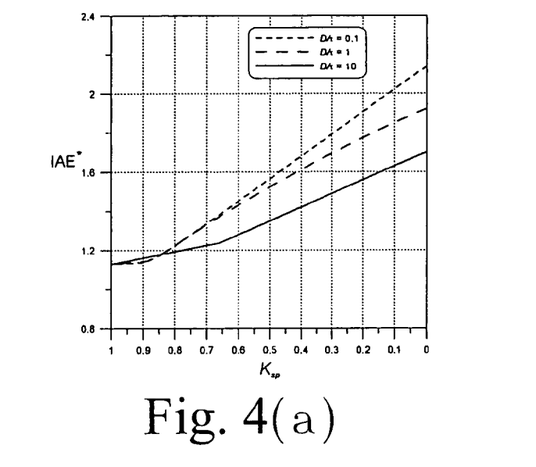
FIG. 4(a) shows a simulation result of the integrated absolute error for the controller with adjustable deadtime compensation according to a preferred embodiment of the present invention when the unit step setpoint changes.
Figure 4B:
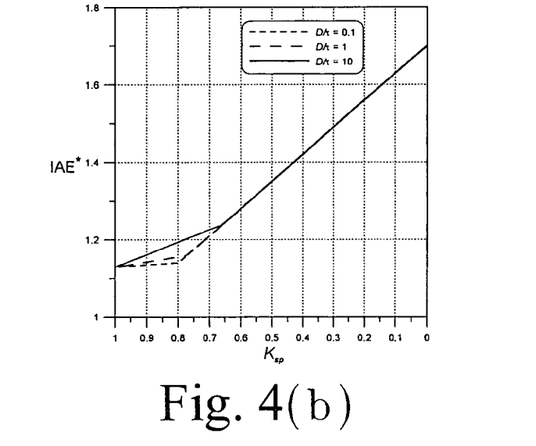
FIG. 4(b) shows a simulation result of the integrated absolute error for the controller with adjustable deadtime compensation according to a preferred embodiment of the present invention when the load changes.
Figure 4C:
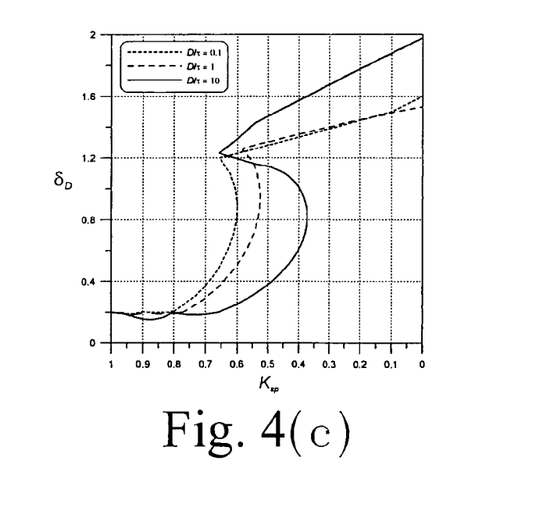
FIG. 4(c) shows a simulation result of the tolerable deadtime error for the controller with adjustable deadtime compensation according to a preferred embodiment of the present invention.

Eq. (20) can be applied to compute the switching value of $K_{sp}$ ($K_{sw}$) and $\delta_{SP}$ when the $\delta_{D,min}$ is given. Again, the procedure described above can be employed to design the SP-PID for systems with different D/r values. Results reveal that the setpoint performance and robust stability are functions of D/τ while the regulatory performance is almost independent on the deadtime to time constant ratio, as shown in FIG. 4. Furthermore, the improved performance (e.g. IAE*=170% for D=10 with $K_{sp}$=0) actually can be achieved by using a better tuning rule for the PI controller, especially at high D/τ region.

Figure 5A:
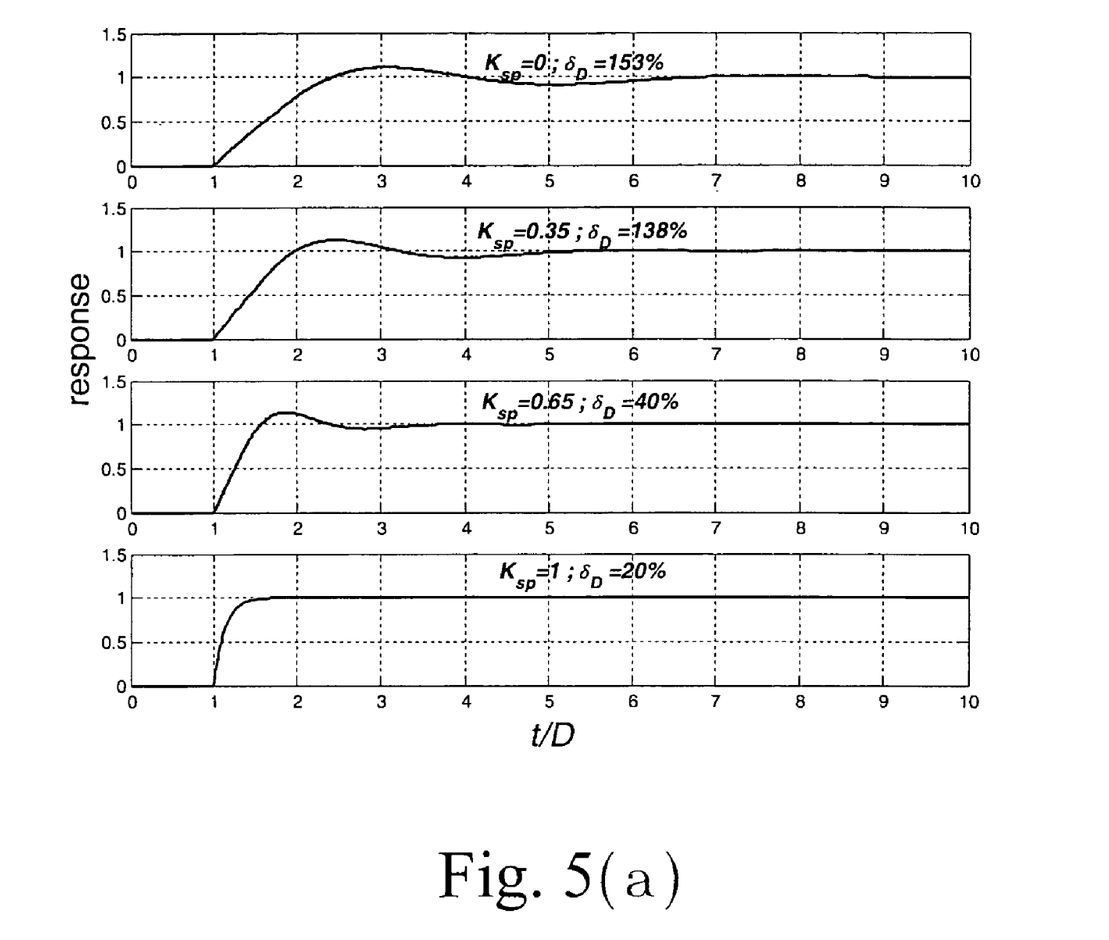
FIG. 5(a) shows a simulation result of the setpoint disturbance dynamic responses by using different $K_{sp}$ settings for the system with $D/\tau=1$.
Figure 5B:
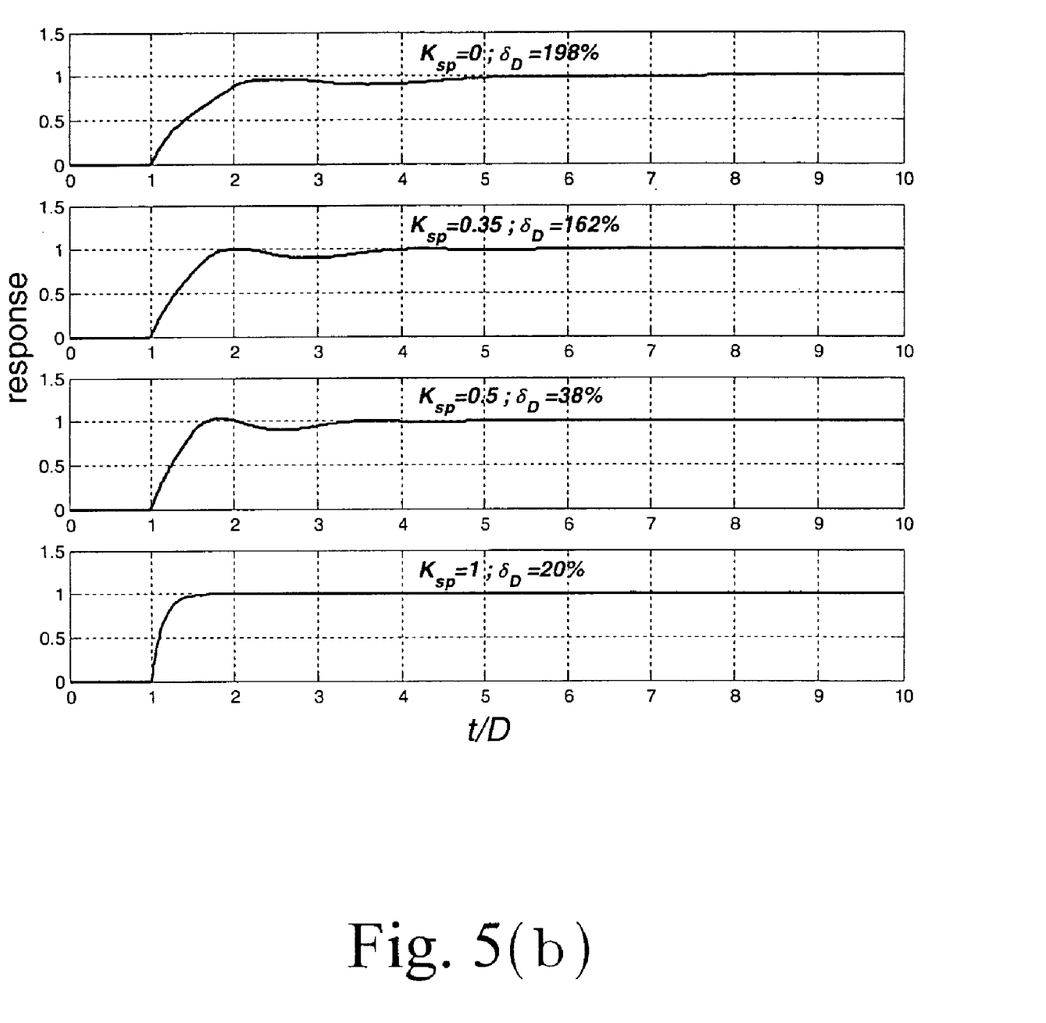
FIG. 5(b) shows a simulation result of the setpoint disturbance dynamic responses by using different $K_{sp}$ settings for the system with $D/\tau=5$.

Let us use a system with D=1 and D=5 to illustrate the performance of the SP-PID control. FIGS. 5(a) and 5(b) show that better performance become evident as we gradually turn on the Smith predictor. But this is achieved with the expense of decreased robustness as shown in FIGS. 5(a) and 5(b), i.e. the tolerable deadtime error ($\delta_D$). FIGS. 5(a) and 5(b) clearly illustrate the advantages of the SP-PID control where the aggressive tuning provided with the correct controller structure can be applied when the model quality is good and the controller structure is detuned via $K_{sp}$ during the model quality degradation.

Robust Performance

Figure 6A:
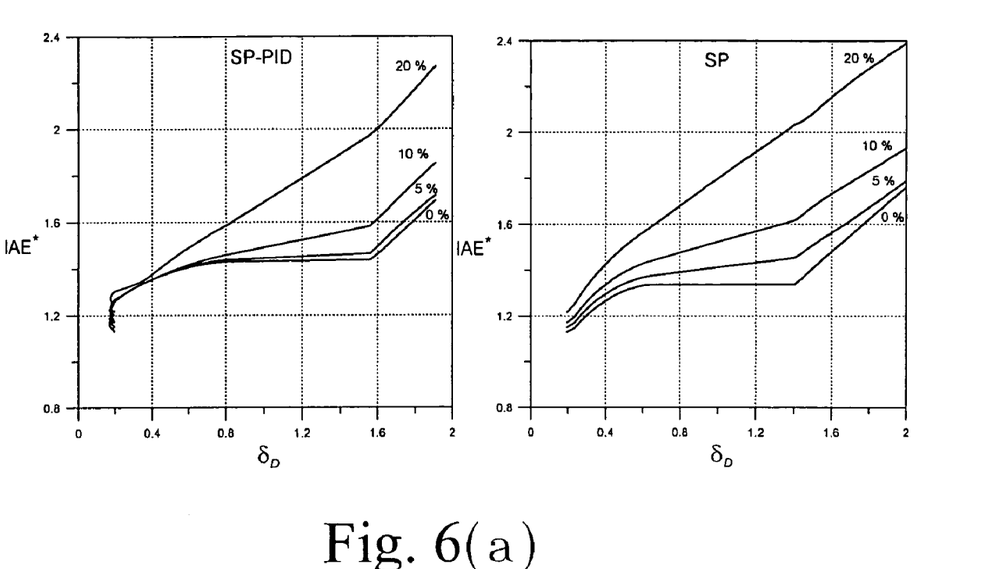
FIG. 6(a) shows the relationships between the integrated absolute error and the tolerable deadtime error for the Smith predictor (right) and for the controller with adjustable deadtime compensation according to a preferred embodiment of the present invention (left) when the setpoint change is under the percentages of (0, 5%, 10%, 20%) of the deadtime errors.
Figure 6B:
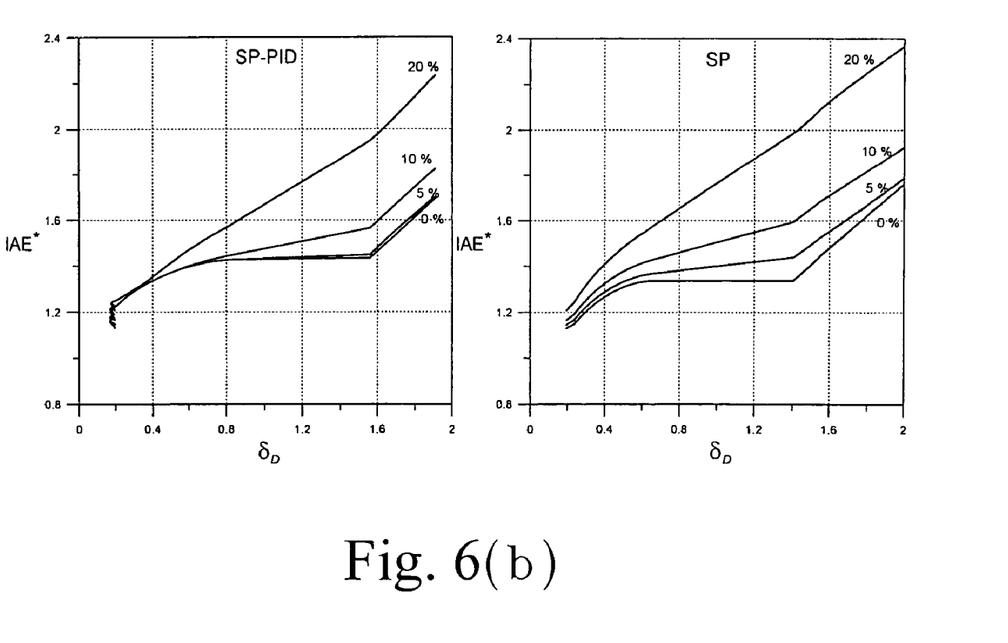
FIG. 6(b) shows the relationships between the integrated absolute error and the tolerable deadtime error for the Smith predictor (right) and for the controller with adjustable deadtime compensation according to a preferred embodiment of the present invention (left) when the load change is under the percentages of (0, 5%, 10%, 20%) of the deadtime errors.
Figure 7A:
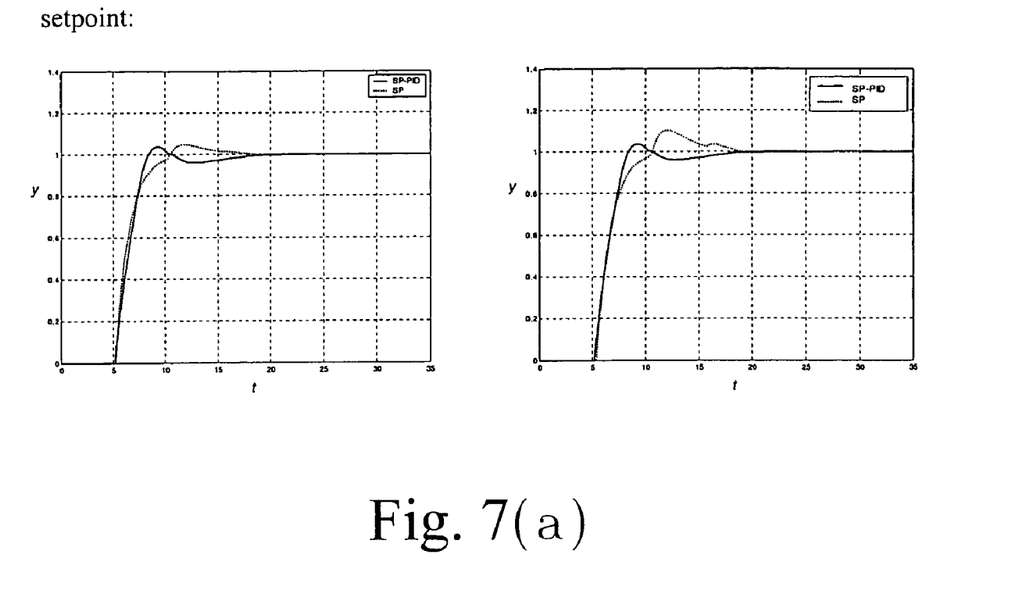
FIG. 7(a) shows the dynamic response for +10% (left) and +20% (right) deadtime errors with D/τ=1 by using the Smith predictor.
Figure 7B:
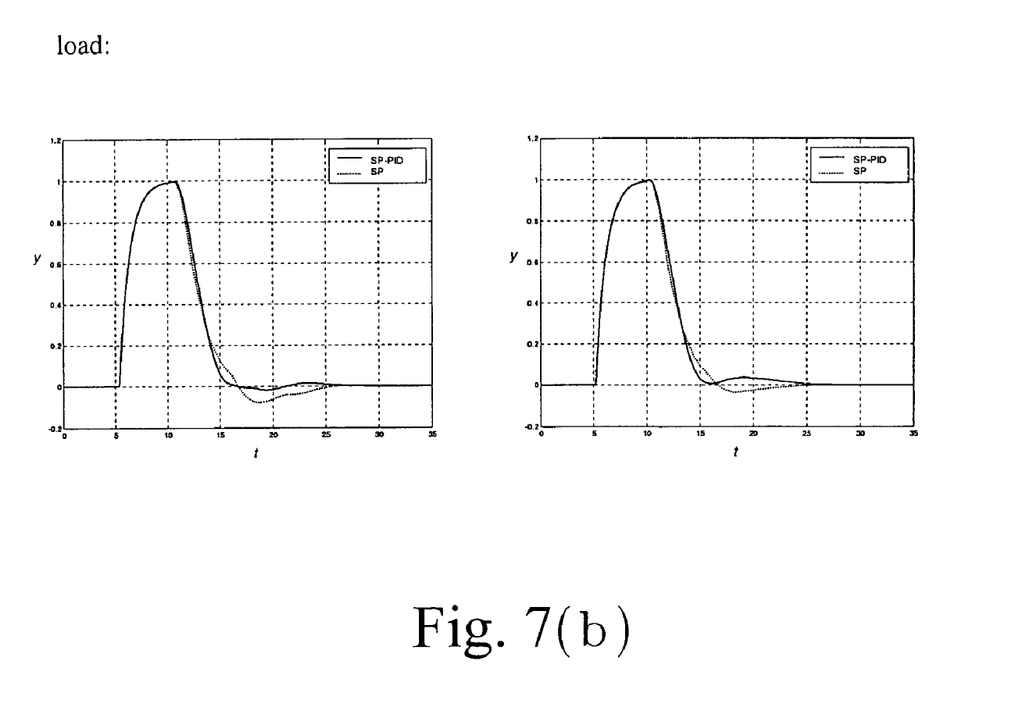
FIG. 7(b) shows the dynamic response for +10% (left) and +20% (right) deadtime errors with D/τ=1 by using the controller with adjustable deadtime compensation according to a preferred embodiment of the present invention.

Up to this point, we have only studied the nominal performance of the SP-PID. One may wonder how the proposed one differs from a detuned Smith predictor? The SP-PID control has two clear advantages over a typical SP. Firstly, it provides a transparent tuning constant $K_{sp}$ in a finite range and the user can use the on-off concept to adjust the performance/robustness tradeoff. For the SP, we really do not know what degree the corresponding PID controller should be detuned when the model quality degrades. Secondly, but not an obvious one, the SP-PID gives a better robust performance. Let us design both the SP-PID (via $K_{sp}$) and the SP (via the closed-loop time constant λ) with the same amount of tolerable deadtime error over a wide range of $\delta_D$, 20%~200%. Again, let us use D=5 case as an example. Nominally, the SP gives better performance over the range of small $\delta_D$ as shown in FIGS. 6(a) and 6(b). However, as the deadtime error increases to 5%, 10%, 20% of the nominal value, the SP-PID shows a slower rate of increase in the integrated absolute error (IAE*) as shown in FIGS. 6(a) and 6(b). This is the case for both setpoint and load changes. FIGS. 7(a) and 7(b) compare the performance of the SP-PID with that of the SP for 10% and 20% deadtime errors for the case of $\delta_D$=40% ($K_{sp}$=0.52 for SP-PID and $\lambda/D$=0.264 for the SP). Similar behaviors are also observed for systems with different D/τ values.

CONCLUSION

The deadtime compensation provides a correct controller structure for process with deadtime. Despite recent advances in the autotune identification and the availability of inexpensive computing power, we have not seen wide-spread applications of the theoretical-correct Smith predictor. On the other hand, the PID controller, a linearization of the SP still constitutes more than 90% of the controllers in process industries. In the present invention, a Smith predictor enhanced PID controller, SP-PID, is proposed. The tuning parameter ($K_{sp}$) gradually transforms the controller from a PID controller to a Smith predictor as varing from 0 to 1. The PID parameters are adjusted according to the remaining deadtime in the feedback loop. The characteristics and stability of the SP-PID are explored and the design procedure is proposed to ensure a pre-specified degree of robustness. Following the design procedure with a minimum deadtime error of 20%, we have the following recommendations for four distinct settings:

Set $K_{sp}$=1 right after autotuning. This corresponds to the tolerable deadtime error ($\delta_D$) of 20% and the normalized integrated absolute error (IAE*) of 1.13 for all D/τ.

Set $K_{sp}$=0.65 for D/τ≦1 and $K_{sp}$=0.5 for D/τ>1 when the oscillatory behavior occurs. This corresponds to $\delta_D$=40%, IAE*=1.38 for D/τ=1 and $\delta_D$=38%, IAE*=1.35 for D/τ=10.

Set $K_{sp}$=0.35 when oscillatory behavior is again observed. This corresponds to $\delta_D$=138%, IAE*=1.65 for D/τ=1 and $\delta_D$=162%, IAE*=1.45 for D/τ=10.

When significant oscillation still exits, the SP-PID is turned to a PID controller, $K_{sp}$=0. This gives $\delta_D$=153%, IAE*=1.92 for D/τ=1 and $\delta_D$=198%, IAE*=1.70 for D/τ=10.

Certainly, when the PID control ($K_{sp}=0$) still can not provide a satisfactory control performance, a further detuning and/or autotune identification should be initiated. Simulation results show that the SP-PID indeed takes advantage of the theoretically correct SP structure while maintaining the familiar PID structure and user friendliness. More importantly, it can be implemented on current process control computers with virtually no extra hardware cost.

Accordingly, the present invention can effectively solve the problems and drawbacks in the prior arts, and thus it fits the demands of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A controller with an adjustable deadtime compensation for adjusting a control performance and robustness of a system, wherein said controller receives a set point, comprising:
   a feedback controller for generating a first function in response to a difference between said set point and a feedback function;
   a process for generating a second function in response to a sum of said first function and a load variable of said system; and
   a deadtime compensator coupled to said feedback controller for generating a third function in response to said first function, wherein said feedback function is a difference between said second function and said third function;
   wherein said deadtime compensator comprises a first transfer function having a tuning parameter so that a feedback deadtime constant is adjusted by controlling said tuning parameter of said transfer function, thereby adjusting said control performance and robustness of said system, and a second transfer function expressed as $\tilde{G}=\tilde{G}^*e^{-\tilde{D}s}$, wherein $\tilde{G}$ is a process model, $\tilde{G}^*$ is a delay free part of the process model, $\tilde{D}$ is a deadtime of the process model, and with said first transfer function being expressed as $\tilde{G}^*=e^{-\tilde{D}s}-e^{-(1-K_{SP})\tilde{D}s}$, wherein $K_{SP}$ is said tuning parameter.

2. The controller as claimed in claim 1, wherein said feedback deadtime constant of said system is $(1-K_{SP})\tilde{D}$.

3. The controller as claimed in claim 1, wherein said controller outputs a closed-loop transfer function expressed as $$y = \frac{KG}{1+K\tilde{G}*e^{-(1-K_{SP})\tilde{D}s}+KG-K\tilde{G}}y^{set} + \frac{(1+K\tilde{G}*e^{-(1-K_{SP})\tilde{D}s}-K\tilde{G})G}{1+K\tilde{G}*e^{-(1-K_{SP})\tilde{D}s}+KG-K\tilde{G}}L$$

wherein K is provided by said feedback controller, G is provided by said process, $\tilde{G}^*$ is said delay free part of process model, $\tilde{D}$ is said deadtime of process model, $K_{SP}$ is said tuning parameter, $y^{set}$ is said set point, $\tilde{G}$ is said process model and L is said load variable of said system.

4. The controller as claimed in claim 3, wherein when said system is in a specific model, said closed-loop transfer function is simplified as $$y = \frac{KG}{1+KG*e^{-(1-K_{sp})Ds}}y^{set} + \frac{(1+KG*e^{-(1-K_{sp})Ds}-KG)G}{1+KG*e^{-(1-K_{sp})Ds}}L$$

wherein K is provided by said feedback controller, G is provided by said process, G* is said delay free part of process, D is a process deadtime, $K_{SP}$ is said tuning parameter, $y^{set}$ is said set point and L is said load variable of said system.

5. The controller as claimed in claim 1, wherein said controller is transferred into a Smith predictor as said tuning parameter is set to 1.

6. The controller as claimed in claim 1, wherein said controller is transferred into a PID (Proportion-Integration-Differentiation) controller as said tuning parameter is set to 0.

7. A method for designing a controller with an adjustable deadtime compensation, comprising steps of:
   selecting a first tuning factor;
   determining a minimum deadtime error;
   obtaining a second tuning factor from a first equation and obtaining a switching point of a tuning parameter from a second equation, wherein said first equation is expressed as $\lambda s+e^{-(1+\delta)\tilde{D}s}-e^{-\tilde{D}s}+1=0$, wherein $\lambda$ is a process closed-loop time constant, $\delta$ is a multiplicative deadtime error and $\tilde{D}$ is a deadtime of process model; and
   establishing a closed-loop time constant according to said tuning parameter, said first tuning factor, said switching point of said tuning parameter and said second tuning factor.

8. The method as claimed in claim 7, wherein said first tuning factor is for a PID controller.

9. The method as claimed in claim 7, wherein said minimum deadtime error has a typical value of 0.2.

10. The method as claimed in claim 7, wherein said second equation is expressed as $\lambda s+e^{-(1+\delta)\tilde{D}s}=0$, wherein $\lambda$ is said process closed-loop time constant, $\delta$ is said multiplicative deadtime error and $\tilde{D}$ is said deadtime of process model.

11. The method as claimed in claim 7, wherein said second tuning factor is for a Smith predictor.

12. The method as claimed in claim 7, wherein said closed-loop time constant is expressed as $$\frac{\lambda}{D} = \max\left[(1-K_{sp})\delta_{PI}, (1-K_{sp})\delta_{PI}+\left(\frac{K_{sp}-K_{sw}}{1-K_{sw}}\right)\delta_{SP}\right]$$

wherein $K_{SP}$ is said tuning parameter, $\delta_{PI}$ is said first tuning factor, $K_{SW}$ is said switching point of said tuning parameter, $\delta_{SP}$ is said second tuning factor, $\lambda$ is said closed-loop time constant and D is a process deadtime.

* * * * *